(12) United States Patent
Shinbata

(10) Patent No.: US 7,088,851 B2
(45) Date of Patent: Aug. 8, 2006

(54) IMAGE PROCESSING APPARATUS, IMAGE PROCESSING SYSTEM, IMAGE PROCESSING METHOD AND STORAGE MEDIUM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 10/068,940

(22) Filed: Feb. 11, 2002

(65) Prior Publication Data

US 2002/0154800 A1  Oct. 24, 2002

(30) Foreign Application Priority Data

Feb. 13, 2001  (JP) ............................. 2001-035836

(51) Int. Cl.
G06K 9/00  (2006.01)

(52) U.S. Cl. .................................... 382/132

(58) Field of Classification Search ................ 382/128, 382/132, 266
See application file for complete search history.

(56) References Cited

U.S. PATENT DOCUMENTS

| 4,851,678 | A | | 7/1989 | Adachi et al. | |
|---|---|---|---|---|---|
| 4,870,694 | A | * | 9/1989 | Takeo | 382/128 |
| 4,931,644 | A | | 6/1990 | Adachi et al. | |
| 4,951,201 | A | * | 8/1990 | Takeo et al. | 382/128 |
| 4,992,663 | A | * | 2/1991 | Takeo | 250/587 |
| 5,055,682 | A | * | 10/1991 | Takeo | 250/587 |
| 5,068,788 | A | * | 11/1991 | Goodenough et al. | 382/131 |
| 5,068,907 | A | * | 11/1991 | Takeo | 382/128 |
| 5,343,390 | A | * | 8/1994 | Doi et al. | 382/132 |
| 5,381,791 | A | * | 1/1995 | Qian | 600/436 |
| 5,457,754 | A | * | 10/1995 | Han et al. | 382/128 |
| 5,480,439 | A | * | 1/1996 | Bisek et al. | 128/898 |
| 5,533,084 | A | * | 7/1996 | Mazess | 378/54 |
| 5,577,089 | A | * | 11/1996 | Mazess | 378/54 |
| 5,623,560 | A | * | 4/1997 | Nakajima et al. | 382/295 |
| 5,638,458 | A | * | 6/1997 | Giger et al. | 382/132 |
| 5,668,888 | A | * | 9/1997 | Doi et al. | 382/132 |
| 5,822,393 | A | * | 10/1998 | Popescu | 378/108 |
| 5,862,249 | A | * | 1/1999 | Jang et al. | 382/132 |
| 5,930,327 | A | * | 7/1999 | Lin | 378/62 |
| 5,974,165 | A | * | 10/1999 | Giger et al. | 382/132 |
| 5,974,175 | A | * | 10/1999 | Suzuki | 382/199 |
| 6,138,045 | A | * | 10/2000 | Kupinski et al. | 600/425 |
| 6,249,590 | B1 | * | 6/2001 | Young et al. | 382/103 |
| 6,579,238 | B1 | * | 6/2003 | Simopoulos et al. | 600/443 |
| 6,625,303 | B1 | * | 9/2003 | Young et al. | 382/132 |
| 6,850,634 | B1 | * | 2/2005 | Shinbata | 382/132 |
| 6,853,740 | B1 | * | 2/2005 | Shinbata | 382/132 |

(Continued)

FOREIGN PATENT DOCUMENTS

JP  62-15538  1/1987

(Continued)

OTHER PUBLICATIONS

Translation of Japanese Laid-Open Application No. 2000-99708.

(Continued)

Primary Examiner—Bhavesh M. Mehta
Assistant Examiner—Sath V. Perungavoor
(74) Attorney, Agent, or Firm—Fitzpatrick, Cella, Harper & Scinto

(57) ABSTRACT

An image processing apparatus for processing a photographed image of an object extracts an object region from the photographed image and determines a region from which a feature value of the photographed image is extracted on the basis of a pixel value on a contour in the extracted object region.

11 Claims, 3 Drawing Sheets

U.S. PATENT DOCUMENTS

| | | | | |
|---|---|---|---|---|
| 7,013,035 B1* | 3/2006 | Shinbata | .................... | 382/132 |
| 2002/0031246 A1* | 3/2002 | Kawano | .................... | 382/132 |
| 2002/0085743 A1* | 7/2002 | Kawano | .................... | 382/132 |
| 2002/0154800 A1* | 10/2002 | Shinbata | .................... | 382/132 |
| 2003/0161548 A1* | 8/2003 | Vuylsteke | .................... | 382/274 |
| 2003/0169912 A1* | 9/2003 | Shinbata | .................... | 382/131 |
| 2003/0210831 A1* | 11/2003 | Shinbata | .................... | 382/274 |
| 2005/0036670 A1* | 2/2005 | Shinbata | .................... | 382/132 |
| 2005/0135665 A1* | 6/2005 | Shinbata | .................... | 382/132 |
| 2005/0220356 A1* | 10/2005 | Shinbata et al. | ............ | 382/254 |

FOREIGN PATENT DOCUMENTS

| | | | |
|---|---|---|---|
| JP | 62-15539 | 1/1987 | |
| JP | 62-104263 | 5/1987 | |
| JP | 6-261894 | 9/1994 | |
| JP | 2000-163562 | 6/2000 | ................ 382/132 |
| JP | 2000-99708 | 7/2000 | ................ 382/173 |

OTHER PUBLICATIONS

Translation of Japanese Laid-Open Application No. 2000-163562.

* cited by examiner

US 7,088,851 B2

IMAGE PROCESSING APPARATUS, IMAGE PROCESSING SYSTEM, IMAGE PROCESSING METHOD AND STORAGE MEDIUM

BACKGROUND OF THE INVENTION

1. Field of the Invention

The present invention relates to an image processing apparatus, an image processing system, an image processing method, a program for realizing the functions of the apparatus or the system, a program for executing processing steps of the method, and a storage medium storing the programs which can be read by a computer. In particular, the present invention relates to an image processing apparatus, an image processing system, an image processing method, a program and a computer-readable storage medium, each of which is used for extracting a feature value from an object image to execute image processing of the object image such as the gradation conversion thereof and the like on the basis of the extracted feature value.

2. Related Background Art

When images photographed by photographing means such as a sensor, a camera or the like are outputted to a monitor screen, a film or the like, the gradation conversion of the images are conventionally executed to obtain the images having density values that are easy to observe on the monitor screen, the film or the like.

To put it concretely, in the gradation conversion processing, a feature value of density (hereinafter, also simply referred to as "a feature value") is extracted from an object image, and the gradation conversion of the object image is executed by the use of the extracted feature value.

The feature value of density hereupon means a pixel value or a statistical value of pixel values in a predetermined region of an object image. The pixel value or the statistical value (the feature value) is necessary in order to convert the object image into an image having a desired distribution of the pixel values by the gradation conversion processing, especially, in order to output a predetermined image region of the object image to the film, the monitor screen or the like with a desired density or brightness distribution.

As extraction methods of the feature value, various methods have been proposed.

For example, as an extraction method of a feature value in the case where an image (an X-ray image) of a cervical spine part obtained by the X-raying thereof is outputted to a film for X-ray diagnosis, the following methods were proposed.

(1) Method Disclosed in Japanese Patent Application Laid-Open No. 2000-099708 and So Forth The method determines a region from which a feature value is extracted (hereinafter, the region is referred to as a "feature value extraction region" or a "region of interest (ROI)") on the basis of the contour shape of an object (a cervical spine part or the like), and then the method determines the feature value from the ROI.

(2) Method Disclosed in Japanese Patent Application Laid-Open No. 2000-163562 and So Forth The method determines an ROI on the basis of a mean value of pixels of each line in the direction crossing an object (a cervical spine part or the like) to determine a feature value from the ROI.

However, the conventional feature value extracting methods such as the methods (1) and (2) have the following problems.

For example, in the case where an ROI is determined on the basis of the contour shape (such as positions of concavities of the contour or the like) of an object in an image of a cervical spine part in conformity with the method (1) (the method disclosed in Japanese Patent Application Laid-Open No. 2000-099708 and so forth), the ROI of X-ray images obtained by the front radiographing or the lateral radiographing of the cervical spine part could surely be determined. However, when the cervical spine is greatly bent forward at the time of cervical spine anteflexion radiographing in which the cervical spine part is radiographed in the lateral direction thereof with the cervical spine being bent forward, there is the case where concavity of the contour of the cervical spine part in the X-ray image is not produced at the position of the neck of an object. In this case, no ROI can stably be determined.

On the other hand, in case of radiographing in conformity with the method (2) (the method disclosed in Japanese Patent Application Laid-Open No. 2000-163562 and so forth), ROI's can stably be determined in the X-ray images as long as the X-ray images were obtained by the radiographing of a cervical spine part bent forward slightly, the radiographing of a cervical spine part bent backward, and the radiographing of a cervical spine part from the front side thereof in the X-raying of cervical spine parts. However, for example, in an X-ray image 400 that is shown in FIG. 4 and has been obtained by the X-raying of a neck region that is bent forward greatly and is surrounded by a head part 401 and a shoulder part 402, a line 403 having the maximum mean value among the mean values of lines crossing the neck region crosses the jaw of the object. Consequently, no ROI can accurately be determined in such an X-ray image.

SUMMARY OF THE INVENTION

The present invention was made for eliminating the aforesaid disadvantages of the related art. One object of the invention is to provide an image processing apparatus, an image processing system, an image processing method, a program for realizing the functions of the apparatus or the system, a program for executing processing steps of the method, and a storage medium storing the programs which can be read by a computer, each of which is capable of supplying a good gradation-converted image by configurations in which a ROI, from which a feature value of density to be used for the gradation conversion is extracted, is always stably determined for extracting a suitable feature value of density.

According to the present invention, the foregoing object is attained by providing an image processing apparatus for processing a photographed image of an object, the apparatus comprising: an object extracting portion for extracting an object region which is a region of the object from the photographed image; and an analyzing portion for determining a region from which a feature value of the photographed image is extracted on a basis of a pixel value on a contour in the object region obtained by the object extracting portion.

According to the present invention, the foregoing object is also attained by providing an image processing apparatus for processing a photographed image of an object, the apparatus comprising: an object extracting portion for extracting an object region which is a region of the object from the photographed image; a contour forming portion for determining a pixel on a contour in the object region obtained by the object extracting portion; and an analyzing portion for determining a region from which a feature value of the photographed image is extracted on a basis of a result of analysis of a value of the pixel on the contour determined by the contour forming portion.

Further, the foregoing object is also attained by providing an image processing method for processing a photographed image of an object, the method comprising the steps of: extracting an object region which is a region of the object from the photographed image; and determining a region from which a feature value of the photographed image is extracted on a basis of a pixel value on a contour in the object region obtained at the step of extracting the object region.

Furthermore, the foregoing object is also attained by providing an image processing method for processing a photographed image of an object, the method comprising the steps of: extracting an object region which is a region of the object from the photographed image; determining a pixel on a contour in the object region obtained at the step of extracting the object region; and determining a region from which a feature value of the photographed image is extracted on a basis of a result of analysis of a value of the pixel on the contour obtained at the step of determining the pixel.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

A preferred embodiment of the present invention will be described in detail in accordance with the accompanying drawings.

Figure 1:
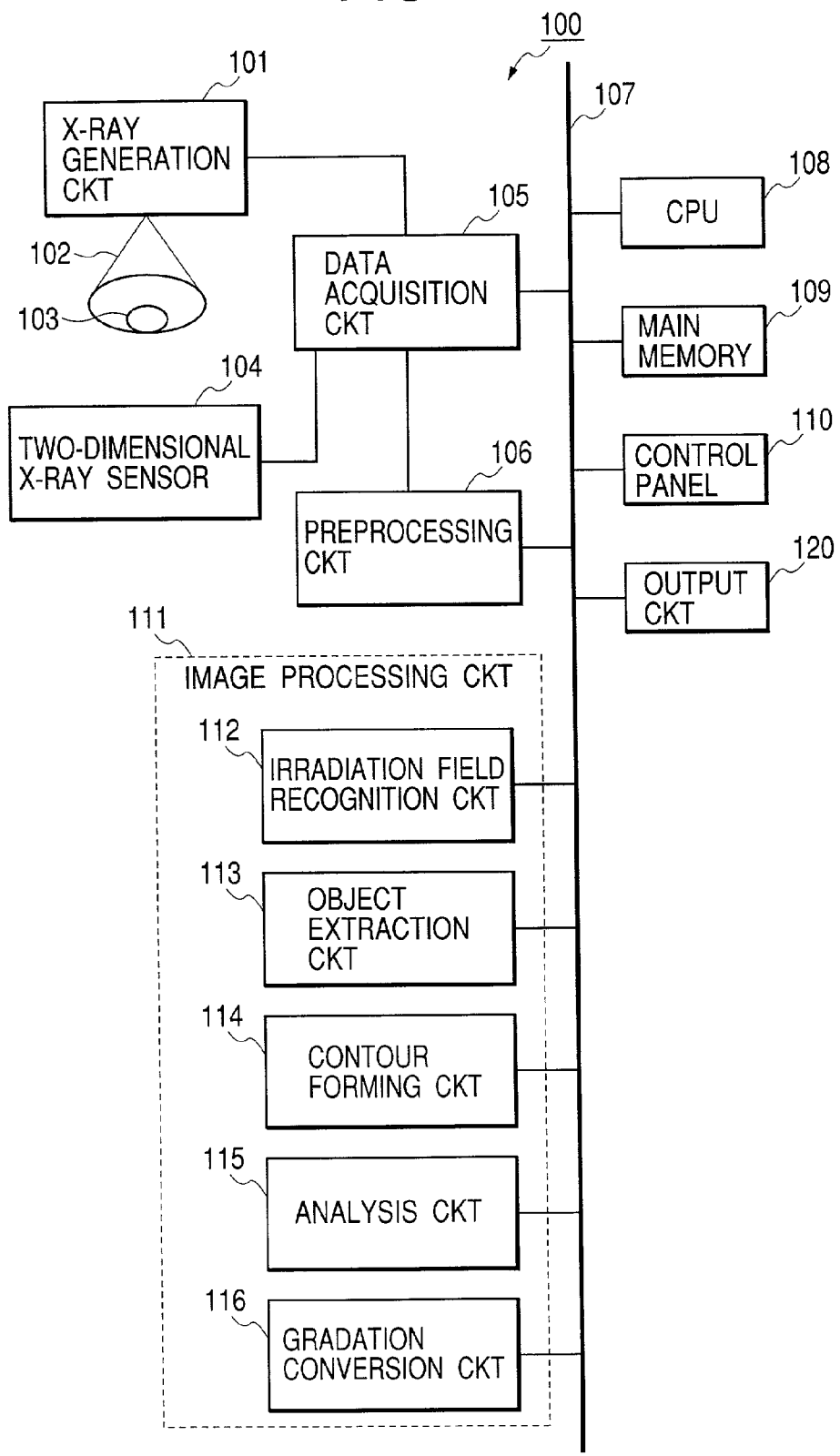
FIG. 1 is a block diagram showing the configuration of a radiographic apparatus to which the present invention is applied.

The present invention is applied to, for example, a radiographic apparatus 100 shown in FIG. 1.

The radiographic apparatus 100 according to one aspect of the present embodiment has the gradation conversion processing function of an image (an X-ray image or a radiographic image) obtained by radiography. In particular, the radiographic apparatus 100 has a configuration that when a feature value (a feature value of density) used for gradation conversion is extracted, a region (ROI) from which a feature value is extracted is determined by image analysis based on a distribution of pixel values on a contour of an object in the subject image and a feature value is extracted from the ROI.

To put it concretely, as shown in FIG. 1, the radiographic apparatus 100 comprises an X-ray generation circuit 101 for generating an X-ray, a two-dimensional X-ray sensor 104 for radiographing an X-ray image based on the X-ray that has transmitted an object 103, a data acquisition circuit 105 for acquiring a radiographed image outputted from the two-dimensional X-ray sensor 104, a preprocessing circuit 106 for preprocessing the radiographed image acquired by the data acquisition circuit 105, a main memory 109 for storing a processing program for executing various kinds of processing and various kinds of information such as the radiographed image (an original image) preprocessed by the preprocessing circuit 106, a control panel 110 for inputting an instruction of the execution of radiography and the like and various kinds of setting of the radiographic apparatus 100; an image processing circuit 111 for executing image processing, which includes gradation conversion processing, of the radiographed image (the original image) preprocessed by the preprocessing circuit 106, an output circuit 120 for performing outputting for displaying the radiographed image having been image-processed by the image processing circuit 111, and the like, and a central processing unit (CPU) 108 managing the operation control of the whole of the radiographic apparatus 100. The data acquisition circuit 105, the preprocessing circuit 106, the image processing circuit 111, the CPU 108, the main memory 109, the control panel 110 and the output circuit 120 are connected with each other through a CPU bus 107 in a state capable of communicating mutually.

The image processing circuit 111 has a most featured configuration among the components of the present embodiment. That is, the image processing circuit 111 includes an irradiation field recognition circuit 112, an object extraction circuit 113, a contour forming circuit 114, an analysis circuit 115 and a gradation conversion circuit 116. The irradiation field recognition circuit 112 extracts an irradiation region (a region, which is irradiated with the X-ray, of the two-dimensional X-ray sensor 104) in the original image to be objective (an objective image). The object extraction circuit 113 extracts a region (hereinafter simply referred to as an "object region" also) remaining by deleting a through region (a region, which is directly irradiated with X-ray, of the two-dimensional X-ray sensor 104) and a part of region of the object 103 adjoining the through region in a predetermined width from the irradiation region obtained by the irradiation field recognition circuit 112. The contour forming circuit 114 extracts pixels on an outer contour of the region of the object 103 obtained by the object extraction circuit 113. The analysis circuit 115 extracts a target point by analyzing the value of the pixel on the outer contour obtained by the contour forming circuit 114, and then extracts a feature value by determining a region of interest (ROI) on the basis of the extracted point. The gradation conversion circuit 116 performs the gradation conversion of the objective image on the basis of the feature value obtained by the analysis circuit 115.

Figure 2:
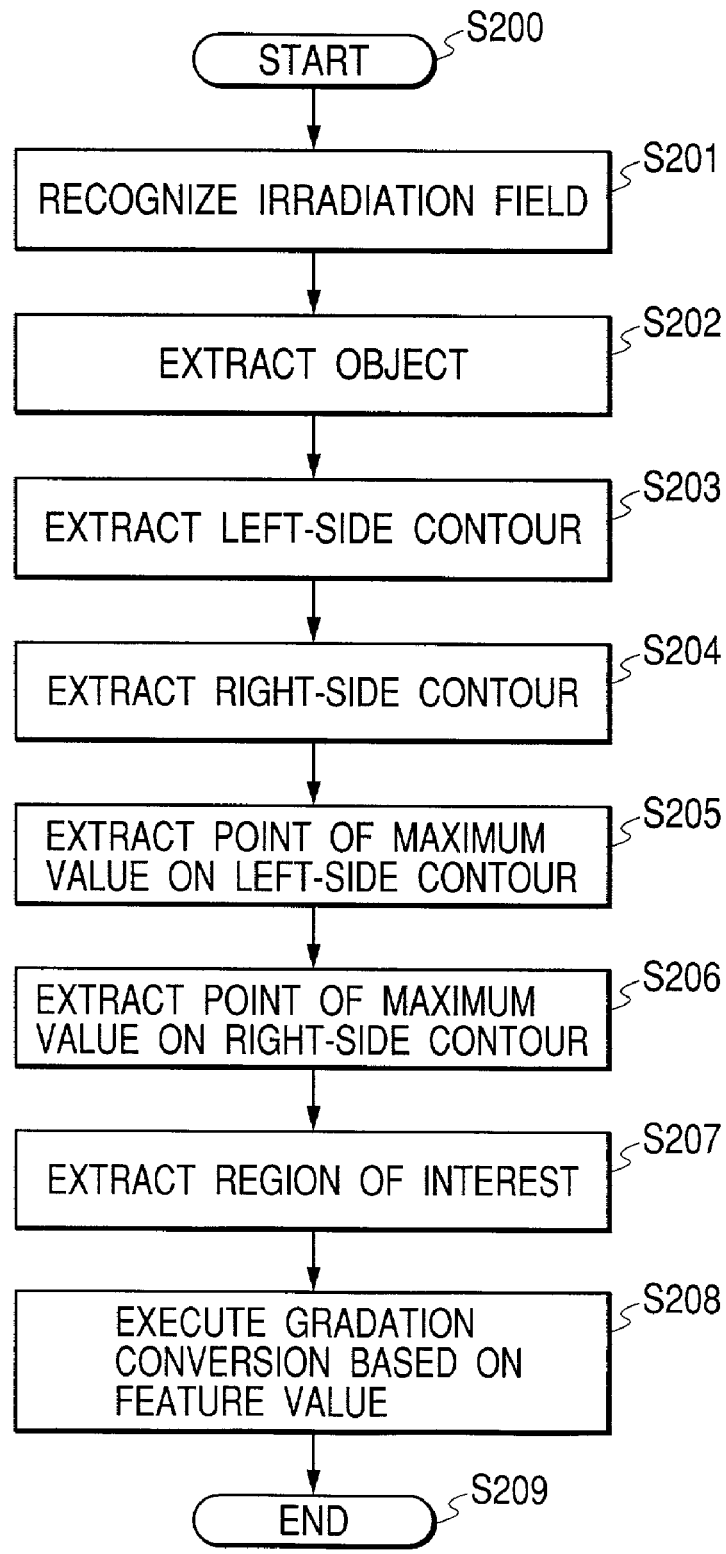
FIG. 2 is a flowchart showing the operation of the radiographic apparatus.

In the radiographic apparatus 100 described above, the main memory 109 previously stores data, processing programs and the like that are necessary for the execution of various kinds of processing in the CPU 108, and the main memory 109 also functions as a working memory for the work of the CPU 108. For example, a processing program in conformity with the flowchart shown in FIG. 2 is hereupon used as the processing program to be stored in the main memory 109, especially as the processing program for gradation conversion processing.

Consequently, the CPU 108 performs the operation control of the whole of the radiographic apparatus 100, which will be described in the following, in conformity with the operations by means of the control panel 110 by reading the aforesaid processing program and the like from the main memory 109 to execute them.

STEP S200:

At first, the X-ray generation circuit 101 radiates an X-ray beam 102 to the object (an object to be radiographed or examined) 103 by means of a not shown X-ray tube. The X-ray beam 102 radiated from the X-ray tube transmits the object 103 while being attenuated to reach the two-dimensional X-ray sensor 104. The two-dimensional X-ray sensor 104 picks up an image of the reached X-ray to output an electric signal corresponding to the X-ray image.

Figure 3:
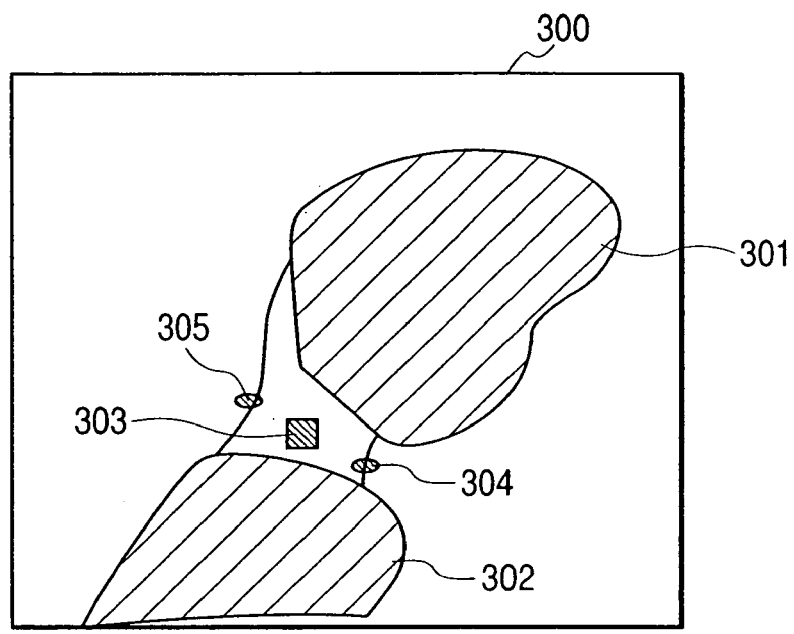
FIG. 3 is a diagram for illustrating an example of an image to be an object of processing by the radiographic apparatus.
Figure 4:
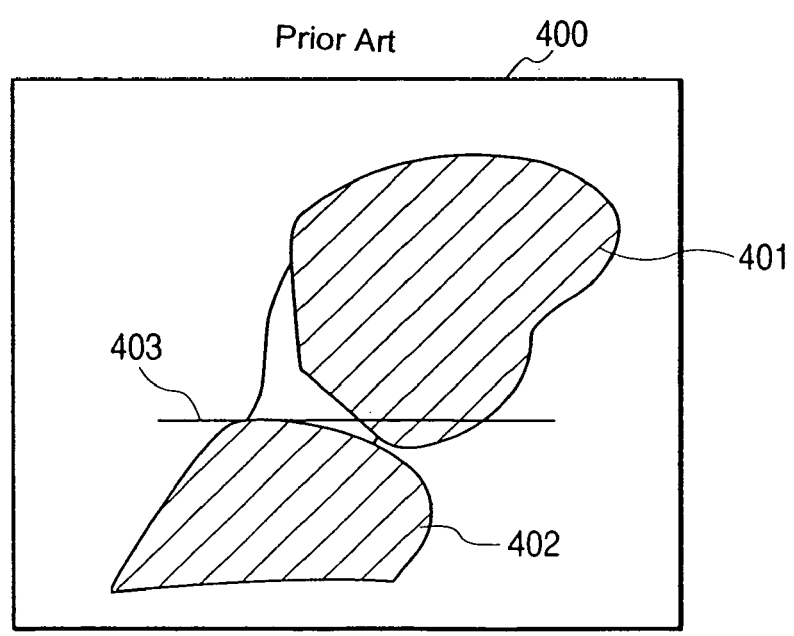
FIG. 4 is a diagram for illustrating a problem of conventional feature value extraction.

Hereupon, the X-ray image outputted from the two-dimensional X-ray sensor 104 is supposed to be, for example, a cervical spine image 300 shown in FIG. 3.

In FIG. 3, reference numeral 301 designates a head part; reference numeral 302 designates a shoulder part; and reference numerals 304 and 305 designate points (pixels) having the maximum value on each contour. And reference numeral 303 designates a region of a cervical spine (an ROI) from which a feature value is extracted, the detail of which will be described later.

Incidentally, because the X-ray transmission rates of the head part 301 and the shoulder part 302 are low, the pixel values at the head part 301 and the shoulder part 302 are smaller than those at a throat part, a through part and the like. Hereupon, a part where the X-ray transmission rate is low is supposed to be a low pixel value part, and a part where the X-ray transmission rate is high is supposed to be a high pixel value part. However, the change of formulation in the inverse case are easy for a person skilled in the art.

Next, the data acquisition circuit 105 converts the electric signal outputted from the two-dimensional X-ray sensor 104 into an image signal, and supplies the converted image signal to the preprocessing circuit 106.

The preprocessing circuit 106 performs preprocessing of the signal (an X-ray image signal) from the data acquisition circuit 105 such as the offset correction processing, the gain correction processing and the like.

The X-ray image signal having been preprocessed by the preprocessing circuit 106 is transmitted to the main memory 109 and the image processing circuit 111 as the information of an input image through the CPU bus 107 under the control of the CPU 108.

STEP S201:

In the image processing circuit 111, the irradiation field recognition circuit 112 extracts an irradiation region from the input image (an original image) transmitted under the control of the CPU 108.

STEP S202:

The object extraction circuit 113 replaces the pixel values on the outside of the irradiation region obtained by the irradiation field recognition circuit 112 with, for example, a value of zero. Next, the object extraction circuit 113 replaces the pixel values in a through region and a part of a region of the object 103 adjoining the through region in a predetermined width in the irradiation region with, for example, a value of zero, and thereby the object extraction circuit 113 extracts the object region in the original image.

To put it concretely, the object extraction circuit 113 performs the processing of the image f(x, y) after the replacement of the pixel values on the outside of the irradiation region with the value of zero in conformity with, for example, the following formula (1), and thereby the object extraction circuit 113 extracts an image f1(x, y) in which the pixel values on the outside of the object region are further replaced by the value of zero.

$$f1(x, y) = f(x, y) X \prod_{x1=-d1}^{x1=d1} \prod_{y1=-d2}^{y1=d2} \text{sgn}(x + x1, y + y1) \quad (1)$$

In the formula (1), the term "sgn(x, y)" is expressed by the following formula (2) by means of a constant Th1, which is experientially determined, (for example, a value of 90% of the maximum pixel value in the whole of the image), and constants d1 and d2 that determine the width of the object region to be deleted.

$sgn(x, y)=0$: in case of $f(x, y) \geq Th1$, $sng(x, y)=1$: the other cases. (2)

STEP S203, STEP S204:

The contour forming circuit 114 extracts the contour of a region (the object region) where pixel values are not replaced by the value of zero from the image f1(x, y) obtained by the object extraction circuit 113.

In this case, the contour forming circuit 114 extracts the left-side contour of the image f1(x, y) by scanning each row (each horizontal pixel train) of the image f1(x, y) from the left side end thereof to detect an x coordinate of a pixel (hereinafter referred to as a "change coordinate"), the value of which changes from zero to another value (1). Then, the contour forming circuit 114 extracts the right-side contour of the image f1(x, y) by scanning each row of the image f1(x, y) from the right side end thereof to detect an x coordinate of a pixel (the change coordinate), the value of which changes from zero to another value. When the contour forming circuit 114 cannot detect any change coordinate in the aforesaid processes, the contour forming circuit 114 sets the end portion of the image f1(x, y) (for example, the end portion of the image f1(x, y) on the side from which the scanning is started) as a contour for the sake of convenience.

Then, the contour forming circuit 114 obtains pixel values on the left-side contour and pixel values on the right-side contour.

STEP S205, STEP S206:

The analysis circuit 115 extracts the pixel (a left maximum value point) 305 having the maximum pixel value among those on the left-side contour and the pixel (a right maximum value point) 304 having the maximum pixel value among those on the right-side contour as to each of the left-side contour and the right-side contour obtained by the contour forming circuit 114 (see FIG. 3).

STEP S207:

The analysis circuit 115 extracts a point having the minimum value on a line segment connecting the left maximum value point 305 with the right maximum value point 304 that have been obtained at STEP S205 and STEP S206 (the point having the minimum pixel value in the cervical spine region on the line segment), and further the analysis circuit 115 extracts a predetermined region including the minimum value point as the ROI 303 (see FIG. 3). Incidentally, the point having the minimum value on the line segment exists in the cervical spine region on the line segment.

Then, the analysis circuit 115 calculates statistics such as a mean pixel value in the extracted region 303, and the analysis circuit 115 determines the statistics as the feature value.

STEP S208:

The gradation conversion circuit 116 performs the gradation conversion of the original image on the basis of the feature value obtained by the analysis circuit 115.

STEP S209:

The output circuit 120 outputs the image after the image processing such as the gradation conversion thereof by the image processing circuit 111 in the way described above to a monitor screen of a cathode-ray tube (CRT) or the like for displaying the image thereon or to a recording medium such as a film or the like for recording the image thereon.

As described above, because the present embodiment is configured to determine an ROI from which a feature value is extracted by analyzing pixel values on contours in an object region in an objective image, the embodiment can stably determine the ROI in any cases where an object in the objective image has any postures or any positions. Consequently, the embodiment can extract a suitable feature value.

For example, in an X-ray image obtained by radiographing of a cervical spine from the lateral, a neck part necessarily has pixel values higher than those in a head part and a shoulder part, and a neck part necessarily exists on left-side and right-side contours of an object even if the cervical spine bends forward or backward greatly. Consequently, the maximum values on the left-side and the right-side contours are necessarily detected in the neck part. Therefore the line segment connecting the maximum values on the left-side and the right-side contours of the object necessarily crosses only the neck part. Hence, the present embodiment can always extract an ROT from the neck part stably by means of the configuration described above.

Consequently, the present embodiment can stabilize the density of an image after the gradation conversion.

Incidentally, the present embodiment may be configured, for example, to make a smoothed image of the image f1(x, y) after the extraction of an object and then to execute the processing of the steps after STEP S203 in FIG. 2. The smoothed image SUS(x, y) in this case can be made in conformity with the following formula (3) and formula (4), in which dx and dy designate mask sizes.

$$SUS(x, y) = \frac{\int_{-dx}^{dx}\int_{-dy}^{dy} f1(x, y) \times \text{sign}(f1(x, y))dxdy}{\int_{-dx}^{dx}\int_{-dy}^{dy} \text{sign}(f1(x, y))dxdy} \quad (3)$$

if x=0 sign(x)=0 otherwise sign(x)=1      (4)

Consequently, in the aforesaid case, the feature point is extracted on the contours of the smoothed image of an object. In the case where the image to be processed is, for example, an image of a cervical spine part described above, no point having a locally high pixel value in a part other than the neck part is erroneously extracted consequently. Hence, an ROI can stably be extracted in the case also.

Incidentally, a configuration for making a smoothed image of an input image (an original image) to execute the steps after STEP S201 in FIG. 2 for the smoothed image can obtain a similar advantage as a modified example.

As described above, the present embodiment is configured to determine a region (an ROI), from which a feature value to be used for the image processing such as gradation conversion and the like is extracted, on the basis of the pixel values on the contours in an object region of a picked up image (a radiographed image or the like). Thereby, the feature value extracting region in a predetermined radiographed image can stably be determined.

Moreover, because the present embodiment is configured to determine a feature value extracting region on the basis of a pixel having a pixel value having a predetermined characteristic (such as the maximum value or the like) on a contour in an object region, the present embodiment can stably determine the feature value extracting region having a predetermined positional relation with the pixel having the pixel value having the predetermined characteristic on the contour.

Moreover, because the present embodiment is configured to determine a feature value extracting region on the basis of a plurality of pixels having pixel values having a predetermined characteristic (such as the maximum value or the like) on contours in an object region, the present embodiment can stably determine the feature value extracting region having a predetermined positional relation with the plural pixels having the pixel values having the predetermined characteristic on the contours.

Moreover, because the present embodiment is configured to determine a feature value extracting region on the basis of a pixel having a pixel value having a predetermined characteristic (such as the maximum value or the like) on a contour on one side in an object region and a pixel having a pixel value having a predetermined characteristic (such as the maximum value or the like) on a contour on the other side in the object region, the present embodiment can stably determine the feature value extracting region having a predetermined positional relation with each of the pixels having the pixel values having the predetermined characteristic on the contours on both sides.

Moreover, because the present embodiment is configured to determine a feature value extracting region on the basis of pixel values on a line segment connecting a pixel having a pixel value having a predetermined characteristic (such as the maximum value or the like) on a contour on one side in an object region with a pixel having a pixel value having a predetermined characteristic (such as the maximum value or the like) on a contour on the other side in the object region, the present embodiment can stably determine the feature value extracting region having a characterized pixel value (such as the minimum value or the like) on the line segment. In the case where an image to be picked up is, for example, a radiograph of a cervical spine part, because the maximum value on each contour on the right side and the left side of an object is necessarily extracted in a neck part between a head part and a shoulder part, the line segment connecting two pixels having the maximum values on each contour of the object crosses only the neck part. Consequently, the present embodiment can stably determine a feature value extracting region from the neck part even for an image of a cervical spine bent forward greatly.

Moreover, when the present embodiment is configured to determine a feature value extracting region of a picked up image on the basis of a pixel value on a contour in an object region obtained from an image in which the object region is smoothed, the configuration according to the present embodiments does not erroneously extract a pixel having a pixel value having a predetermined characteristic (such as a high pixel value or the like) locally on a contour in a region other than an objective region, and then the present embodiment can stably determine the feature value extracting region. For example, in the case where a picked up image is a radiograph of a cervical spine part, the configuration according to the present embodiment does not erroneously extract a pixel having a locally high pixel value on a contour in a region other than the neck part being objective, and then the embodiment can stably determine a feature value extracting region in the objective neck part.

OTHER EMBODIMENT

Note that the present invention may be applied to either a system constituted by a plurality of apparatuses (e.g., image processing apparatuses, interfaces, radiographic apparatuses, X-ray generation apparatuses, and the like) or an arrangement that integrates an image processing apparatus and a radiographic apparatus, or the like.

Further, the object of the present invention can also be achieved by providing a storage medium storing program codes for performing the aforesaid processes to a computer system or apparatus (e.g., a personal computer), reading the program codes, by a CPU, MPU or the like of the computer system or apparatus, from the storage medium, then executing the program.

In this case, the program codes read from the storage medium realize the functions according to the embodiment, and the storage medium storing the program codes constitutes the invention.

Further, as the storage medium, a floppy disk, a hard disk, an optical disk, a magneto-optical disk, a CD-ROM, a CD-R, a magnetic tape, a non-volatile type memory card, a ROM and the like can be used for providing the program codes.

Furthermore, besides the aforesaid functions according to the above embodiment being realized by executing the program codes which are read by a computer, the present invention includes a case where an OS (operating system) or the like working on the computer performs a part of or the entire process in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part of or the entire processes in accordance with designations of the program codes and realizes functions of the above embodiment.

In a case where the present invention is applied to the aforesaid storage medium, the storage medium stores program codes corresponding to the flowchart shown in FIG. 2 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image processing apparatus for processing a photographed image of a body including a neck region, said apparatus comprising:

an object extracting portion configured to extract a body region from the photographed image;

a region extracting portion configured to extract a region of a cervical spine by determining a minimum value on a line segment connecting a pixel showing a maximum value on a contour on one side of the body region and a pixel showing a maximum value on a contour on the other side of the body region;

an analyzing portion configured to calculate a statistics value from the extracted region; and a gradation conversion portion configured to execute a gradation conversion processing on the photographed image based on the statistics value.

2. An image processing apparatus according to claim 1, wherein said object extracting portion extracts the object based on a through region and a region adjoining the through region in a predetermined width.

3. An image processing apparatus according to claim 1, wherein the photographed image is an image obtained by radiographing of the object.

4. An image processing apparatus according to claim 1, wherein the image of the body including the neck region is a smoothed image.

5. An image processing system in which a plurality of apparatuses are connected with each other in a state capable of communicating with each other, wherein the system has each function of the image processing apparatus according to claim 1.

6. A computer-readable storage medium, said medium storing a program configured to make a computer realize functions of the image processing system according to claim 5.

7. A computer-readable storage medium, said medium storing a program configured to make a computer realize functions of the image processing apparatus according to claim 1.

8. An image processing apparatus according to claim 1, wherein the statistics value is an average value.

9. An image processing apparatus according to claim 1, wherein the neck region includes the cervical spine region.

10. An image processing method for processing a photographed image of a body including a neck region, said method comprising the steps of:

extracting a body region from the photographed image;

extracting a region of a cervical spine by determining a minimum value on a line segment connecting a pixel showing a maximum value on a contour on one side of the body region and a pixel showing a maximum value on a contour on the other side of the body region;

calculating a statistics value from the extracted region; and executing a gradation conversion processing on the photographed image based on the statistics value.

11. A computer-readable storage medium, said medium storing a program configured to make a computer execute steps of the image processing method according to claim 10.

* * * * *